United States Patent
Braun et al.

(10) Patent No.: US 6,938,536 B2
(45) Date of Patent: Sep. 6, 2005

(54) CENTRAL RELEASE DEVICE FOR A HYDRAULIC CLUTCH ACTUATION SYSTEM

(75) Inventors: Ruthart Braun, Stadtlauringen (DE); Stefan Gebert, Gestungshausen (DE); Elmar Kuhn, Pfarrweisach (DE); Jan Gnyp, Ebern (DE); Johannes Burkard, Konigsberg (DE)

(73) Assignee: FTE automotive GmbH & Co., KG, Ebern (DE)

( * ) Notice: Subject to any disclaimer, the term of this patent is extended or adjusted under 35 U.S.C. 154(b) by 0 days.

(21) Appl. No.: 10/817,478

(22) Filed: Apr. 2, 2004

(65) Prior Publication Data

US 2004/0206598 A1 Oct. 21, 2004

(30) Foreign Application Priority Data

Apr. 2, 2003 (DE) .......................................... 103 14 864

(51) Int. Cl.[7] .......................... F16J 10/00; F16D 19/00
(52) U.S. Cl. .................. 92/169.1; 192/85 CA
(58) Field of Search ........................... 92/165 R, 169.1, 92/169.3, 169.4; 192/85 CA, 98

(56) References Cited

U.S. PATENT DOCUMENTS

| | | | |
|---|---|---|---|
| 5,887,692 A | * | 3/1999 | Zelikov et al. ......... 192/85 CA |
| 6,044,950 A | | 4/2000 | Thomire et al. |
| 6,092,637 A | | 7/2000 | Otto et al. |
| 6,216,840 B1 | * | 4/2001 | Peterseim ................... 192/98 |
| 6,390,267 B1 | * | 5/2002 | Elflein ................... 192/85 CA |
| 6,595,341 B1 | * | 7/2003 | Venz .......................... 92/169.1 |
| 6,719,115 B2 | * | 4/2004 | Rogner et al. ............. 92/169.1 |

FOREIGN PATENT DOCUMENTS

| | | |
|---|---|---|
| DE | 296 08 918 U1 | 8/1996 |
| DE | 697 16 211 T2 | 10/1997 |
| DE | 199 56 771 A1 | 6/2000 |

* cited by examiner

*Primary Examiner*—Thomas E. Lazo
(74) *Attorney, Agent, or Firm*—Reising, Ethington, Barnes, Kisselle, P.C.

(57) ABSTRACT

A central release device (10) is disclosed having a cylinder housing (12), with a cylindrical wall (14), and a guide sleeve (16), which is arranged concentrically therewith and on which an annular piston (18), which can be operatively connected to a clutch and can be hydraulically actuated by way of a pressure chamber (20) defined by the cylindrical wall and the guide sleeve, is displaceably guided. At its end the guide sleeve has an annular flange (22) with an end face (24) facing away from the annular piston and a radially outer circumferential surface (26), by way of which flange the guide sleeve is fixed to an end face (28) of the cylinder housing. According to the invention at least one axial groove (30), which starts at the end face and in which an insert (32) is firmly fitted, gripping behind the circumferential surface of the annular flange, is formed in the cylinder housing adjacent to the annular flange, an upper side (34) of the insert facing away from the annular piston lying in a plane defined by the end face of the annular flange or in front of this plane, viewed from the annular piston. As a result, a central release device of simple design is created which has a relatively short overall axial length.

22 Claims, 2 Drawing Sheets

CENTRAL RELEASE DEVICE FOR A HYDRAULIC CLUTCH ACTUATION SYSTEM

Figure 1:
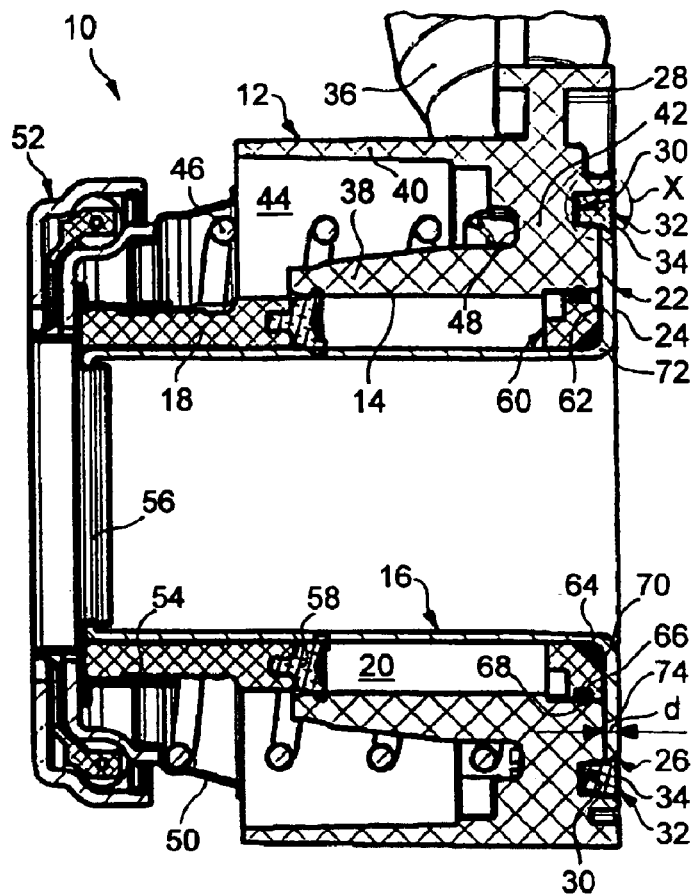

The present invention relates to a central release device for a hydraulic clutch actuation system. The invention relates in particular to a central release device of a hydraulic clutch actuation system for a motor vehicle friction clutch, such as are used on a large scale in the motor vehicle industry.

A conventional hydraulic clutch actuation system for motor vehicles has a master cylinder which is connected to a compensating reservoir filled with hydraulic fluid and which can be actuated by way of a clutch pedal, for example. The master cylinder is hydraulically connected by a pressure line to a slave cylinder, so that the pressure generated in the master cylinder by depressing the clutch pedal can be transmitted to the slave cylinder via the liquid column in the pressure line. As a result the slave cylinder applies an actuating force to the release bearing of the friction clutch, so that a release mechanism separates the clutch pressure plate from the clutch drive plate, thereby separating the engine from transmission of the motor vehicle.

In order to ensure a uniform actuation of the friction clutch with the slave cylinder taking up as little space as possible, the slave cylinder in the prior art is designed as an annular cylinder, which is arranged around the clutch or transmission shaft and is preferably fixed to the transmission case. An annular piston, which is operatively connected to the release bearing of the friction clutch, is arranged in the annular cylinder so that it is capable of displacement in the axial direction of the clutch or transmission shaft. When the annular cylinder is hydraulically actuated via the pressure line, the annular piston acts by way of the release bearing on the release lever of the friction clutch, in order to release the latter. Owing to their concentric arrangement with the clutch or transmission shaft, such slave cylinders are also referred to as central release devices.

Modern central release devices—see the generic DE 197 42 468 A1—have a cylinder housing with a cylindrical wall, for reasons of cost and weight mainly made of plastic, together with a guide sleeve which is principally made from deep-drawn sheet steel and is arranged concentrically inside the cylindrical wall. The annular piston, which can be operatively connected to the friction clutch by way of the release bearing and which may be hydraulically actuated, as required, by way of an annular pressure chamber defined by the cylindrical wall and the guide sleeve, in order to release the friction clutch, is displaceably guided on the guide sleeve. In this prior art the guide sleeve at its end has an annular flange, which has an end face facing away from the annular piston and a radially outer circumferential surface, the guide sleeve being fixed to an end face of the cylinder housing by way of said annular flange.

In the prior art there is no lack of proposals as to how the annular flange of the guide sleeve can be fixed to the cylinder housing. Thus DE 197 42 468 A1 discloses a snap connection between guide sleeve and cylinder housing, in which the annular flange of the guide sleeve is provided over its circumference with a right-angled fold designed to form an axial section, which at its end has an edge directed radially outwards, whilst the cylinder housing on its end face has an annular groove, which has an undercut, against which the edge locates when the guide sleeve is fitted. Concentrically with the annular groove, the cylinder housing is provided with a notch, the length of which exceeds that of the annular groove and which only permits a radial deflection of a snap lug on the cylinder housing forming the undercut when introducing the axial section of the annular flange into the annular groove of the cylinder housing.

Apart from the costly design of the annular flange of the guide sleeve (axial section with end edge) and of the cylinder housing in respect of the guide sleeve connection (annular groove with undercut and concentric notch), a particular disadvantage of this prior art is that the design of the snap connection, with the axial section and the edge on the annular flange of the guide sleeve on the one hand, together with the undercut and the notch on the cylinder housing on the other, of necessity gives the central release device a relatively large overall axial length. However, the overall axial space available for the central release device in the power train of the motor vehicle, in which the friction clutch, the central release device and the transmission are successively arranged in tandem, is very tight. This is made more difficult by the prevalence of design variants in which differently performing friction clutches are accommodated in the same clutch housing, something which the central release device cannot be allowed to impede.

Figure 2:
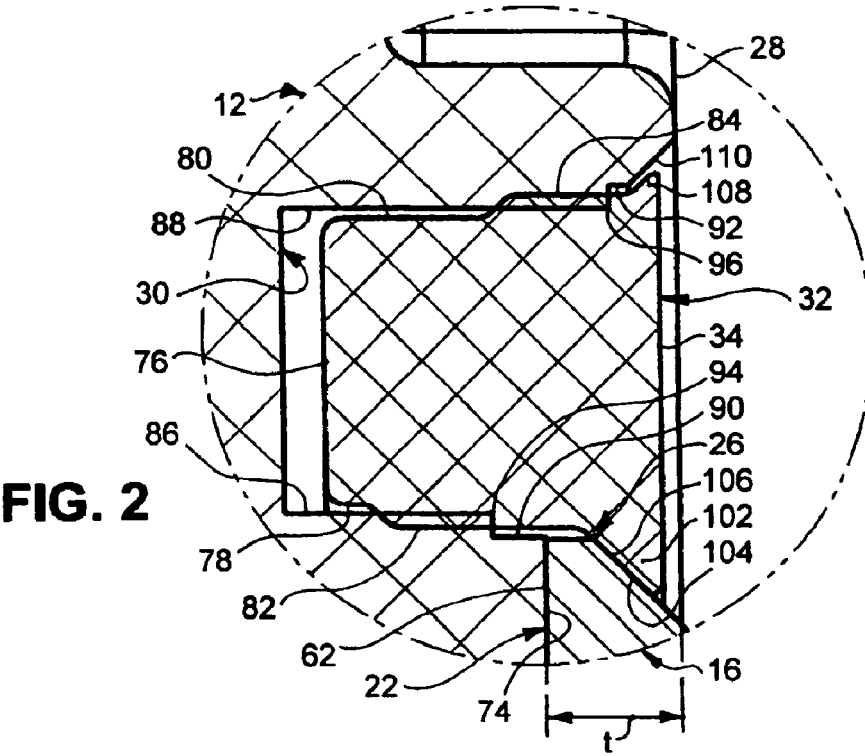

In addition to the snap connections between guide sleeve and cylinder housing described above (in this context see also DE 199 23 853 A1), designs have also been disclosed in the prior art in which a screwed connection (WO 01/71209 A1; FIG. 2), a strap connection (WO 01/71209 A1: FIG. 5, 6), a riveted connection (WO 01/71209 A1: FIG. 7) or a connection made by caulking molded attachments of the cylinder housing (DE 197 16 219 A1) is used for fixing the guide sleeve to the cylinder housing of the central release device. These connections also, however, take up additional axial space or require costly molding, at least of the annular flange of the guide sleeve.

Proceeding from the prior art according to DE 197 42 468 A1, the object of the invention is therefore to create a central release device of the simplest possible design and the shortest possible overall axial length for a hydraulic clutch actuation system.

According to the invention, in a central release device intended for a hydraulic clutch actuation system and having a cylinder housing, with a cylindrical wall, and a guide sleeve, which is arranged concentrically inside the cylindrical wall and on which an annular piston, which can be operatively connected to a clutch and can be hydraulically actuated, as required, by way of a pressure chamber, defined by the cylindrical wall and the guide sleeve, in order to release the clutch, the guide sleeve at its end having an annular flange with an end face facing away from the annular piston and a radially outer circumferential surface, by way of which flange the guide sleeve is fixed to an end face of the cylinder housing, at least one axial groove, which starts at or emerges from the end face and in which an insert is firmly fitted, gripping behind the circumferential surface of the annular flange in order to fix the guide sleeve to the cylinder housing, is formed in the cylinder housing adjacent to the annular flange, an upper side of the insert facing away from the annular piston lying in a plane defined by the end face of the annular flange or in front of this plane, viewed from the annular piston.

The fact that the insert grips behind the annular flange of the guide sleeve only on the circumferential surface thereof, whilst the upper side of the insert facing away from the annular piston lies in a plane defined by the end face of the annular flange, or in front of this plane, viewed from the annular piston, that is to say, in other words, it does not project beyond this plane of the central release device, means that this fixing arrangement has a very short overall axial length. Compared to the generic prior art, the axial groove on the end face of the cylinder housing also needs to be of only a comparatively small depth in order to fix the insert, and can furthermore be formed without an undercut or the like. This also contributes towards a short overall axial length and to ease of manufacture of the central release device. In addition, the method of connecting the guide sleeve to the cylinder housing, as proposed by the invention, in which the upper side of the insert does not project beyond the plane of the central release device defined by the end face of the annular flange, has the advantage that if the central release device is flange-connected to the transmission case by its cylinder housing in a manner known in the art, the annular flange of the guide sleeve being accommodated between the cylinder housing and the transmission case, the insert at any rate is not subjected to any force and the fixing of the guide sleeve to the cylinder housing is consequently not adversely affected. A further advantage from the production engineering standpoint is that in the fixing of the guide sleeve to the cylinder housing, as proposed by the invention, the annular flange of the guide sleeve can be of plane design construction, that is to say a complicated design of the annular flange in the axial direction of the guide sleeve, as in the generic prior art, can be dispensed with. Recesses, holes, punched through-openings etc. in the annular flange of the guide sleeve, which are sometimes needed in the prior art (DE 199 23 853, WO 01/71209 A1) in order fix the guide sleeve to the cylinder housing, are also ultimately unnecessary, which not only makes the guide sleeve easier to manufacture but also advantageously allows the guide sleeve to be fitted to the cylinder housing with the guide sleeve unoriented in respect of the angle of rotation about its central axis.

In principle it is possible to provide the cylinder housing with just one axial groove, which is of annular shape and concentric with the cylindrical wall, and in which an insert of essentially complementary annular shape is fitted. However, a development is preferred in which a plurality of axial grooves, which in plan view are of segmental shape, are formed in the cylinder housing, in each of which grooves an insert of essentially complementary, that is to say likewise segmental shape, is fitted. Such a non-annularly enclosed design of the insert in fact means that axial groove and insert need not have such close tolerances in order to fit together. Any geometrical deviations in the axial groove or the insert can then, if necessary, be compensated for by the greater flexibility of the segmental insert compared to that of an insert of annular design. In addition, the cylinder housing material existing between the segmental axial grooves in a circumferential direction advantageously enhances the rigidity of the cylinder housing.

Various joining techniques for fixing the insert in the axial groove are feasible provided that these do not lead to an unwanted increase in the overall axial space. For example, the insert can be bonded into the axial groove by means of a suitable adhesive. For preference, however, the cylinder housing and the insert are composed of ultrasonically weldable plastics and the insert is welded ultrasonically to the cylinder housing. An ultrasonic welding process is particularly well suited to a cost-effective, automated assembly of the insert in mass production. In addition to machining advantages, the use of plastic as a material for cylinder housing and insert also affords weight advantages compared to a metal construction.

In this case the insert, on its inside facing the guide sleeve and its outside facing away from the guide sleeve, can in each case be provided with a step, which when fitting the insert into the assigned axial groove of the cylinder housing can be welded under the effect of ultrasound to an adjoining flank of the axial groove. Although the insert could also be welded to the cylinder housing on only one side of the insert, in particular its inside facing the guide sleeve, a double-sided welding of the insert to the axial flanks of the cylinder housing by contrast has the advantage that no moments can be transmitted to the welding points via the insert. A further advantage here is that prior to ultrasonic welding the insert can be pre-positioned on the axial groove of the cylinder housing by way of its section superimposed on the steps. This, too, contributes towards problem-free, automated fitting of the insert in mass production.

If, in the fitting direction of the of the insert, the step on the inside of the insert and the step on the outside of the insert are furthermore matched to one another in respect of their position and length, in such a way that the steps can be welded to the adjoining flanks of the axial groove simultaneously and essentially over the same length, unwanted tilting of the insert in relation to the axial groove cannot occur during the ultrasonic welding. This also serves to minimize the time taken for the ultrasonic welding process.

The axial groove in the cylinder housing may suitably have an essentially rectangular groove cross-section, which makes the cylinder housing and the insert easier to manufacture, particularly where these are made of injection molded plastic.

Although it is possible to provide a retaining lug with a step, for example, on the insert, the step gripping behind a step of complementary shape on the circumferential surface of the annular flange, in order to fix the guide sleeve to the end face of the cylinder housing with the flattest possible positively interlocking fit, the preference here is for a positively interlocking connection in which a retaining lug, having a bevel, which grips behind a circumferential bevel of complementary shape on the annular flange extending from the end face of the annular flange on the circumferential surface thereof, is formed on the insert. Such bevels represent an easy way of compensating for any tolerances on or between the components involved. If the guide sleeve is of deep-drawn sheet steel, the bevel on the circumferential surface of the annular flange may also readily be formed when cutting the guide sleeve out from the deep-drawing blank, the annular flange at the same time being advantageously strengthened by deformation in the area of the bevel.

A development of the central release device, in which a recess is formed in the cylinder housing starting from the end face thereof the depth of which recess is equal to or less than the thickness of the annular flange, likewise contributes towards a short overall length of the central release device. With the central release device fitted to the transmission case, the guide sleeve defined by the annular flange can still be supported on the transmission case, so that among other things leaks between guide sleeve and cylinder housing can be reliably prevented.

It is in principle also possible to center the guide sleeve in relation to the cylindrical wall by way of the annular flange or by using assembly jigs and fixtures when fixing the guide sleeve to the cylinder housing. However, an annular part is preferably provided, which is arranged between the guide sleeve and the cylindrical wall at the end of the pressure chamber facing away from the annular piston and which centers the guide sleeve in relation to the cylindrical wall. This advantageously defines a clear separation of functions, in which the annular part serves to center the guide sleeve in relation to the cylindrical wall whilst the insert on the annular flange of the guide sleeve serves solely for fixing the guide sleeve to the cylinder housing.

Finally, although it is in principle possible to seal off the pressure chamber of the central release device at its end facing away from the annular piston by means of a seal which is arranged between the end face of the cylinder housing and the annular flange of the guide sleeve, as is proposed, for instance, by WO 01/71209 A1 cited above, in a further development of the central release device the pressure chamber is preferably sealed off from the surroundings by means of a sealing arrangement provided on the annular part. This has the advantage that the hydraulic pressure in the pressure chamber cannot act on the face of the annular flange facing the annular piston, which would have a tendency to weaken the fixing of the guide sleeve to the cylinder housing.

Figure 3:
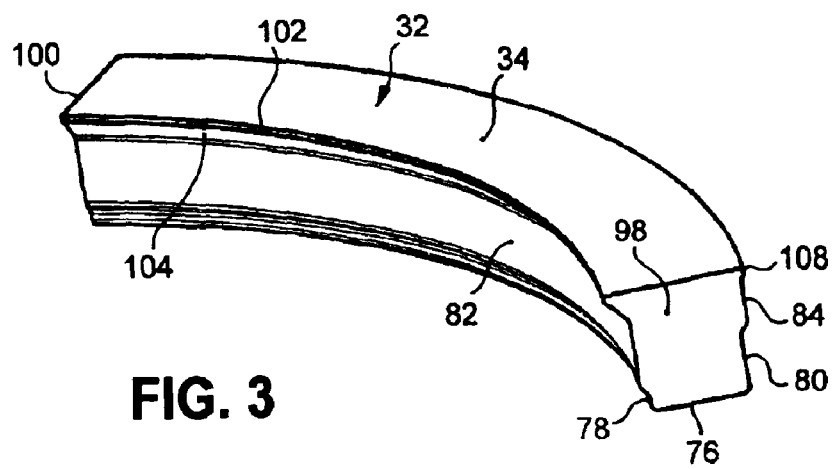
Figure 4:
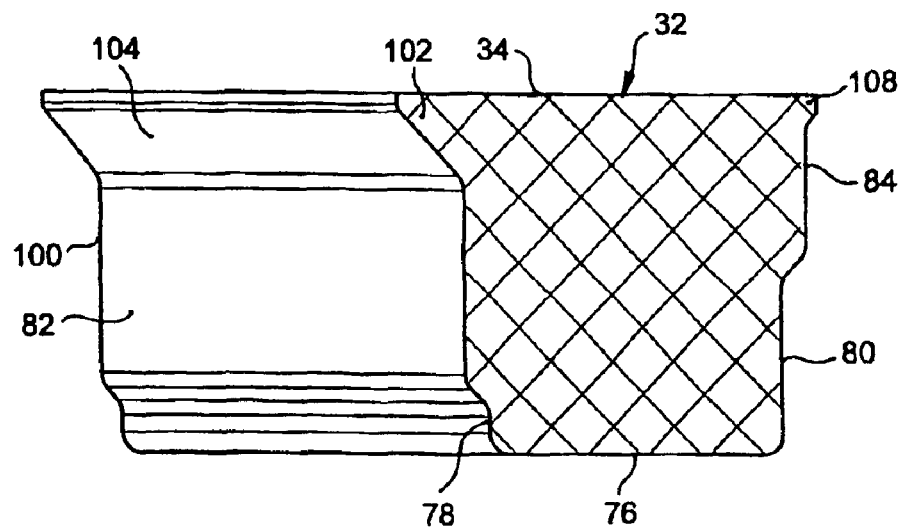

The invention will be explained in more detail below on the basis of a preferred example of an embodiment and with reference to the drawings attached, in which:

FIG. 1 shows a top-truncated longitudinal section through a central release device designed according to the invention, having a cylinder housing and a guide sleeve for an annular piston fixed thereto by way of an annular flange, making particular use of inserts, FIG. 2 shows an enlarged representation of the detail X in FIG. 1, showing the details of how the guide sleeve is fixed to the cylinder housing, FIG. 3 shows an enlarged, perspective representation of an insert, which in the central release device according to FIG. 1 is used to fix the guide sleeve to the cylinder housing, and FIG. 4 shows an enlarged side view of the insert according to FIG. 3.

FIG. 1 shows a central release device 10 for a hydraulic clutch actuation system for dry friction clutches in a basic position and in the non-mounted state. The central release device 10 has a cylinder housing 12 composed of plastic, having a cylindrical wall 14 and a guide sleeve 16, which is arranged concentrically inside the cylindrical wall 14 and is made from deep drawn sheet steel. A plastic annular piston 18, which can be operatively connected to the dry friction clutch (not shown) and can be hydraulically actuated, as required, by way of a pressure chamber 20 defined by the cylindrical wall 14 and the guide sleeve 16, or more precisely by the outer circumferential surface thereof is displaceably guided on the guide sleeve 16 in order to release the dry friction clutch through displacement of the annular piston 18. At its end, that is to say at its right-hand end in FIG. 1, the guide sleeve 16 has a plane annular flange 22, which has an end face 24 facing away from the annular piston 18 and a radially outer circumferential surface 26. The guide sleeve 16 is fixed to an end face 28 of the cylinder housing 12 by way of the annular flange 22. An essential feature, as will be described in more detail below, is that at least one, and in the example of an embodiment shown two axial grooves 30, which start at or emerge from the end face 28 essentially on diametrically opposite sides of the central axis of the guide sleeve 16, are formed in the cylinder housing 12 adjacent to the annular flange 22, in each of which grooves an insert 32 of essentially complementary shape is firmly fitted, gripping behind the circumferential surface 26 of the annular flange 22, in order to fix the guide sleeve 16 to the cylinder housing 12. In this case an upper side 34 of each insert 32 facing away from the annular piston 18 lies at least in a plane defined by the end face 24 of the annular flange 22 of the guide sleeve 16 or in front of this plane, viewed from the annular piston 18, as shown in FIG. 2, giving this fixing arrangement a very short overall length in the axial direction of the central release device 10.

According to FIG. 1 the cylinder housing 12 has a pressure connection 36 extending away from its outer circumference, through which a pressure medium duct (not shown) extends, which opens into the pressure chamber 20 at a point not shown here. A pressure line (not shown) can be connected to the pressure connection 36 so that the pressure medium, that is hydraulic fluid, can be delivered to the pressure chamber 20 via the pressure medium duct. In addition, the cylinder housing 12 in the example of an embodiment shown has two concentrically arranged, essentially hollow-cylindrical wall sections 38, 40, which at one end, that is the right-hand end in FIG. 1, are connected to one another by way of a flange section 42. The flange section 42 is provided on its outer circumference with a plurality of angularly spaced fixing eyes (not shown), which in the motor vehicle serve in a manner known in the art for fixing the central release device 10 to a transmission wall or a transmission cover (not shown) by means of bolts (not shown), for example, which pass through the fixing eyes and pull the central release device 10 with the end face 28 of the cylinder housing 12 against the transmission wall or the transmission cover. The cylinder housing 12 with the pressure connection 36 adjoining the flange section 42, its wall sections 38, 40 and the flange section 42 connecting theses and provided with the fixing eyes, is preferably formed in one piece by plastic injection molding.

The cylindrical inner circumferential surface of the radially inner wall section 38 of the cylinder housing 12 forms its cylindrical wall 14, whilst the outer circumferential surface of the wall section 38 together with the opposing and axially slightly longer inner circumferential surface of the radially outer wall section 40 of the cylinder housing 12, defines an annular space 44. The annular space 44 in FIG. 1 is open on the left and terminates at the flange section 42 of the cylinder housing 12 on the right-hand side in FIG. 1.

The annular space 44 serves to accommodate a preloading spring 46, which in the example of an embodiment shown is a helical compression spring, which at its right-hand end in FIG. 1 is supported in an annular groove 48 on the flange section 42 of the cylinder housing 12 and on its left-hand side in FIG. 1 applies a defined preloading force to a release bearing 52, known in the art, by way of a deep-drawn sheet metal spring plate 50. The release bearing 52 is suitably fixed by means of a sheet-metal part 54 to the left-hand end of the annular piston 18 in FIG. 1, so that when the annular pressure chamber 20 is pressurized the release bearing 52 can be displaced in an axial direction, that is to say a horizontal direction in FIG. 1, in order to release or engage the dry friction clutch in a manner known in the art. Also visible in FIG. 1 is a sheet-metal ring 56, which is fixed to the left-hand end of the guide sleeve 16 and which projects slightly outwards in a radial direction beyond the guide sleeve 16, thereby forming a stop for the annular piston 18, which prevents the annular piston 18, together with the components connected thereto, from being pulled down from the guide sleeve when the central release device 10 is in the unmounted state.

A dynamic seal in the form of an elastomer cup seal 58 is suitably fitted to the right-hand end of the annular piston 18 in FIG. 1, which in the basic position shown still slightly overlaps the cylindrical wall 14 in an axial direction. The cup seal 58, for the sake of simplicity here shown in the undeformed state, bears tightly both on the cylindrical wall 14 of the cylinder housing 12 and on the outer circumferential surface of the guide sleeve 16 in order to seal off the pressure chamber 20 to the left in FIG. 1.

At the end of the pressure chamber 20 facing away from the annular piston 18, that is to say at the right-hand end in FIG. 1, an annular part 60, preferably of injection molded plastic, which centers the guide sleeve 16 in relation to the cylindrical wall 14, is inserted between the guide sleeve 16, or more precisely its outer circumferential surface, and the cylindrical wall 14 of the cylinder housing 12. The annular part 60 has an essentially L-shaped cross-section, the shorter leg of which bears on the outer circumferential surface of the guide sleeve 16, whilst the longer leg thereof bears on the annular surface 62 of the annular flange 22 of the guide sleeve 16 facing the annular piston 18. With its outer circumferential surface the annular part 60 finally bears on the cylinder housing 12.

Also provided on the annular part 60 is a static sealing arrangement which seals off the pressure chamber 20 to the right of FIG. 1 from the surroundings. In the example of an embodiment shown the sealing arrangement has two elastomer O-rings 64, 66, the one O-ring 66 of which is seated in an annular groove 68 formed on the outer circumference of the annular part 60, in order to form a seal between the annular part 60 and the cylinder housing 12. The other O-ring 64 forms a seal between the annular part 60 and the guide sleeve 16, for which purpose it is inserted between a chamfer 70 of the annular part 60 on the one hand and a transitional section 72 of the guide sleeve 16, running between the sleeve area and the annular flange 22 thereof, on the other.

Finally it can also be seen from FIG. 1 that in the cylinder housing 12, proceeding from the end face 28 thereof, a circular depression or recess 74 is formed, which viewed in a plan view from the right of FIG. 1 is circular and which serves to accommodate the annular flange 22 of the guide sleeve 16. In relation to a plane defined by the end face 28 of the cylinder housing 12, the recess 74 has a depth t, drawn in in FIG. 2, which is equal to or—as in the example of embodiment shown—less than the thickness d, drawn in in FIG. 1, of the annular flange 22 of the guide sleeve 16, so that with its end face 24 the annular flange 22 of the guide sleeve 16 projects slightly beyond the end face 28 of the cylinder housing 12. As a result, when the central release device 10 is fitted to the transmission case (not shown) the guide sleeve 16 is definably supported on the transmission case by way of its annular flange 22.

FIG. 2, on a larger scale than FIG. 1, shows details of how the guide sleeve 16 is fixed to the cylinder housing 12. It must firstly be noted that in the example of an embodiment shown the cylinder housing 12 and the two inserts 32 serving to fix the guide sleeve 16 to the cylinder housing 12 are composed of ultrasonically weldable plastics, and that with the central release device 10 in the assembled state each insert 32 is actually ultrasonically welded to the cylinder housing 12 in the respectively assigned axial groove 30. In order to simplify the drawing and to clearly show the original geometries, however, the cylinder housing 12 and the insert 32 in FIG. 2 are drawn superimposed in the non-ultrasonically welded state, the position of the insert 32 drawn in essentially corresponding to the position of an insert 32 ultrasonically welded to the cylinder housing 12.

As already mentioned at the start of the description of the figures, in the example of an embodiment shown two axial grooves 30, which proceed from the end face 28 of the cylinder housing 12, are formed in the cylinder housing 12 in an essentially diametrically opposed arrangement about the central axis of the guide sleeve 16. Viewed in a radial direction, the axial grooves 30, which according to FIG. 2 have an essentially rectangular groove cross-section, lie at the edge of the recess 74 in the cylinder housing 12. In a plan view looking from the right in FIGS. 1 and 2, each axial groove 30 has a segmental shape. An insert 32, which has an essentially complementary shape to that of the axial groove 30, is firmly fitted into each of the axial grooves 30, as illustrated in FIGS. 3 and 4.

The one insert 32, which according to FIGS. 2 and 4 has a plane underside 76, is provided, as shown in particular by FIG. 2, with a step 82 on its inside 78 facing the guide sleeve 16 and a step 84 on its outside 80 facing away from the guide sleeve 16. When fitting the insert 32 into the assigned axial groove 30 of the cylinder housing 12, the steps 82, 84 can be welded under the effect of ultrasound to an adjoining flank 86 and 88 of the axial groove 30, for which purpose the steps 82, 84 have a certain oversize allowance in relation to the radial dimensions of the axial groove 30. In this case the step 82 on the inside 78 of the insert 32 and the step 84 on the outside 80 of the insert 32 are in their position and length matched to one another in the fitting direction of the insert 32, that is to say viewed in the horizontal direction in FIG. 2, in such a way that the steps 82, 84 can be welded to the adjoining flanks 86 and 88 of the axial groove 30 simultaneously and essentially over the entire length—as shown by the overlapping areas of cylinder housing 12 and insert 32 in FIG. 2. It should also be mentioned in this context that the axial groove 30 is provided with a recess 90 and 92 of rectangular cross-section on its inner circumferential surface and its outer circumferential surface respectively, the recess forming an edge 94 and 96 respectively in the axial groove 30. The recesses 90, 92, the dimensions of which are matched to the steps 82, 84, serve for preliminary centering of the insert 32 on its steps 82, 84 when fitting the insert 32 into the assigned axial groove 30.

As FIGS. 2 to 4 also show, the insert 32 terminating circumferentially in plane end faces 98, 100 and slightly rounded at all face transitions has on its inner circumferential side a retaining lug 102 with a bevel 104 adjoining the upper side 34 and the step 82. According to FIG. 2 the bevel 104 of the retaining lug 102 of triangular cross-section grips behind a circumferential bevel 106 of complementary shape formed on the annular flange 22 of the guide sleeve 16, the latter bevel extending from the end face 24 of the annular flange 22 to the circumferential surface 26 thereof although unlike that in the example of embodiment shown it could also run over the entire thickness d of the annular flange 22. The fact that on one side the annular flange 22, with its annular face 62 facing the annular piston 18 in the recess 74 bears extensively on the cylindrical 12 housing when the central release device 10 is in the assembled state, in which the inserts 32 are firmly fitted in the assigned axial grooves 30 of the cylinder housing 12, whilst on the other side the bevels 104 on the retaining lugs 102 of the inserts 32 bear against the bevel 106 applied to the circumferential surface 26 of the annular flange 22, means that in the axial direction of the central release device 10 the guide sleeve 16 is held on the cylinder housing 12 by a positive interlock. The annular part 60 serves to center the guide sleeve 16 radially in relation to the cylinder housing 12, as has already been mentioned above.

Finally, it can also be seen from FIGS. 2 to 4 that the insert 32, which has a curvature corresponding to the annular flange 22 and the guide sleeve 16 and which need not necessarily take the form of a solid body but may also have a honeycomb profile, has on its outer circumferential side a projecting stop 108 of triangular cross-section, which adjoins the upper side 34 and the step 84 of the insert 32. When fitting the insert 32 into the assigned axial groove 30 the projecting stop 108 can strike against a molded bevel 110 formed on the axial groove 30.

When assembling the central release device 10 the guide sleeve 16 is fixed to the cylinder housing 12 by first pushing the guide sleeve 16 into the cylinder housing 12 until the annular flange 22 of the guide sleeve 16 with its annular face 62 comes to bear on the cylinder housing 12 in the recess 74 of the cylinder housing 12. In so doing the guide sleeve 12 is centered in relation to the cylindrical wall 14 of the cylinder housing 12 by means of the annular part 60. Next the two inserts 32 are pushed into the axial grooves 30 of the cylinder housing 12 until the steps 82, 84 of the respective insert 32 come to bear against the edges 94 and 96 in the assigned axial groove 30. In this state the respective insert 32 is centered in relation to the assigned axial groove 30 by means of the steps 82 and 84 of the insert 32 accommodated in the recesses 90, 92 on the axial groove 30, and those sections of the inside 78 and outside 80 of the insert 32 which are accommodated between the flanks 86, 88 of the axial groove 30 and superimposed on the steps 82 and 84 in the fitting direction of the insert 32.

This is followed by the actual ultrasonic welding process in which each insert 32, by way of its upper side 34, exerts a force and under the effect of ultrasound is continuously pushed further into the assigned axial groove 30 by an ultrasonic welding device known in the art. In the process the steps 82 of the inserts 32 fuse together with the radially inner flanks 86 of the axial grooves 30, whilst the steps 84 of the inserts 32 fuse together with the radially outer flanks 88 of the axial grooves 30. As soon as the retaining lug 102 of the respective insert 32 comes to bear with its bevel 104 against the bevel 106 on the circumferential surface 26 of the annular flange 22, and the projecting stop 108 of the respective insert 32 against the molded bevel 110 on the assigned axial groove 30, which results in a distinct change in the perceived force-travel action of the insertion movement, the ultrasonic welding sequence is terminated. The guide sleeve 16 is now positively and permanently fixed to the cylinder housing 12 by means of the inserts 32. It will be evident to the person skilled in the art that the aforementioned joining process can be fully automated.

The positively interlocking connection obtained is at any rate sufficiently load bearing to allow a conventional pneumatic leak test to be carried out on the central release device 10 and for the central release device 10 to be transported without any problems. As already stated, the positively interlocking connection obtained is further supported, once the central release device 10 is fitted in the motor vehicle, in that the annular flange 22 of the guide sleeve 16 is clamped between the transmission wall or the transmission cover on one side and the cylinder housing 12 on the other.

A central release device is disclosed having a cylinder housing with a cylindrical wall and a guide sleeve, which is arranged concentrically therewith and on which an annular piston, which can be operatively connected to a clutch and can be hydraulically actuated by way of a pressure chamber defined by the cylindrical wall and the guide sleeve, is displaceably guided. At its end the guide sleeve has an annular flange with an end face facing away from the annular piston and a radially outer circumferential surface, by way of which flange the guide sleeve is fixed to an end face of the cylinder housing. According to the invention at least one axial groove, which starts at the end face and in which an insert is firmly fitted, gripping behind the circumferential surface of the annular flange, is formed in the cylinder housing adjacent to the annular flange, an upper side of the insert facing away from the annular piston lying in a plane defined by the end face of the annular flange or in front of this plane, viewed from the annular piston. As a result, a central release device of simple design is created which has a relatively short overall axial length.

What is claimed is:

1. Central release device (10) for a hydraulic clutch actuation system having a cylinder housing (12), with a cylindrical wall (14), and a guide sleeve (16), which is arranged concentrically inside the cylindrical wall (14) and on which an annular piston (18), which can be operatively connected to a clutch and can be hydraulically actuated, as required, by way of a pressure chamber (20) defined by the cylindrical wall (14) and the guide sleeve (16), is displaceably guided in order to release the clutch, the guide sleeve (16) at its end having an annular flange (22) with an end face (24) facing away from the annular piston (18) and a radially outer circumferential surface (26), by way of which flange the guide sleeve (16) is fixed to an end face (28) of the cylinder housing (12), characterized in that at least one axial groove (30), which starts at the end face (28) and in which an insert (32) is firmly fitted, gripping behind the circumferential surface (26) of the annular flange (22), is formed in the cylinder housing (12) adjacent to the annular flange (22) in order to fix the guide sleeve (16) to the cylinder housing (12), an upper side (34) of the insert (32) facing away from the annular piston (18) lying in a plane defined by the end face (24) of the annular flange (22) or in front of this plane, viewed from the annular piston (18).

2. Central release device (10) according to claim 1, characterized in that a plurality of axial grooves (30), which in plan view are of segmental shape, are formed in the cylinder housing (12), in each of which grooves an insert (32) of essentially complementary shape is fitted.

3. Central release device (10) according to claim 2, characterized in that the cylinder housing (12) and the insert (32) are composed of ultrasonically weldable plastics and the insert (32) is welded ultrasonically to the cylinder housing (12).

4. Central release device (10) according to claim 3, characterized in that the insert (32), on its inside (78) facing the guide sleeve (16) and on its outside (80) facing away from the guide sleeve (16), is in each case provided with a step (82 and 84 respectively), which when fitting the insert (32) into the assigned axial groove (30) of the cylinder housing (12), can be welded under the effect of ultrasound to an adjoining flank (86 and 88 respectively) of the axial groove (30).

5. Central release device (10) according to claim 4, characterized in that the step (82) on the inside (78) of the insert (32) and the step (84) on the outside (80) of the insert (32) are in their position and length matched to one another in the fitting direction of the insert (32), in such a way that the steps (82, 84) can be welded to the adjoining flanks (86 and 88) of the axial groove (30) simultaneously and essentially over the same length.

6. Central release device (10) according to claim 5, characterized in that axial groove (30) in the cylinder housing (12) has an essential rectangular groove cross-section.

7. Central release device (10) according to claim 6 characterized in that a retaining lug (102) with a bevel (104), which grips behind a circumferential bevel (106) of complementary shape on the annular flange (22), is formed on the insert (32), the latter bevel extending from the end face (24) of the annular flange (22) to the circumferential surface (26) thereof.

8. Central release device (10) according to claim 7, characterized in that a recess (74) is formed in the cylinder housing (12), proceeding from the end face (28) thereof, in order to accommodate the annular flange (22), the depth (t) of the recess being equal to or less than the thickness (d) of the annular flange (22).

9. Central release device (10) according to claim 8, characterized by an annular part (60), which is arranged at the end of the pressure chamber (20) facing away from the annular piston (18) between the guide sleeve (16) and the cylindrical wall (14) and which centers the guide sleeve (16) in relation to the cylindrical wall (14).

10. Central release device (10) according to claim 9, characterized in that the pressure chamber (20) is sealed off from the surroundings by means of a sealing arrangement (64, 66) provided on the annular part (60).

11. Central release device (10) according to claim 1, characterized in that the cylinder housing (12) and the insert (32) are composed of ultrasonically weldable plastics and the insert (32) is welded ultrasonically to the cylinder housing (12).

12. Central release device (10) according to claim 11, characterized in that the insert (32), on its inside (78) facing the guide sleeve (16) and on its outside (80) facing away from the guide sleeve (16), is in each case provided with a step (82 and 84 respectively), which when fitting the insert (32) into the assigned axial groove (30) of the cylinder housing (12), can be welded under the effect of ultrasound to an adjoining flank (86 and 88 respectively) of the axial groove (30).

13. Central release device (10) according to claim 12, characterized in that the step (82) on the inside (78) of the insert (32) and the step (84) on the outside (80) of the insert (32) are in their position and length matched to one another in the fitting direction of the insert (32), in such a way that the steps (82, 84) can be welded to the adjoining flank (86 and 88) of the axial groove (30) simultaneously and essentially over the same length.

14. Central release device (10) according to claim 1, characterized in that axial groove (30) in the cylinder housing (12) has an essential rectangular groove cross-section.

15. Central release device (10) according to claim 14, characterized in that a retaining lug (102) with a bevel (104), which grips behind a circumferential bevel (106) of complementary shape on the annular flange (22), is formed on the insert (32), the latter bevel extending from the end face (24) of the annular flange (22) to the circumferential surface (26) thereof.

16. Central release device (10) according to claim 15, characterized in that a recess is formed in the cylinder housing (12), proceeding from the end face (28) thereof, in order to accommodate the annular flange (22), the depth (t) of the recess being equal to or less than the thickness (d) of the annular flange (22).

17. Central release device (10) according to claim 16, characterized by an annular part (60), which is arranged at the end of the pressure chamber (20) facing away from the annular piston (18) between the guide sleeve (16) and the cylindrical wall (14) and which centers the guide sleeve (16) in relation to the cylindrical wall (14).

18. Central release device (10) according to claim 17, characterized in that the pressure chamber (20) is sealed off from the surroundings by means of a sealing arrangement (64, 66) provided on the annular part (60).

19. Central release device (10) according to claim 1, characterized in that a retaining lug (102) with a bevel (104), which grips behind a circumferential bevel (106) of complementary shape on the annular flange (22), is formed on the insert (32), the latter bevel extending from the end face (24) of the annular flange (22) to the circumferential surface (26) thereof.

20. Central release device (10) according to claim 1, characterized in that a recess (74) is formed in the cylinder housing (12), proceeding from the end face (28) thereof, in order to accommodate the annular flange (22), the depth (t) of the recess being equal to or less than the thickness (d) of the annular flange (22).

21. Central release device (10) according to claim 1, characterized by an annular part (60), which is arranged at the end of the pressure chamber (20) facing away from the annular piston (18) between the guide sleeve (16) and the cylindrical wall (14) and which centers the guide sleeve (16) in relation to the cylindrical wall (14).

22. Central release device (1) according to claim 21, characterized in that the pressure chamber (20) is sealed off from the surroundings by means of a sealing arrangement (64, 66) provided on the annular part (60).

* * * * *